United States Patent [19]

Ohsawa et al.

[11] Patent Number: 5,296,511
[45] Date of Patent: Mar. 22, 1994

[54] FILM-FORMER COMPOSITION

[75] Inventors: Yoshihito Ohsawa; Kohei Hasegawa, both of Annaka; Masanori Sutou, Takasaki; Satoshi Kuwata, Annaka, all of Japan

[73] Assignee: Shin-Etsu Chemical Co., Ltd., Tokyo, Japan

[21] Appl. No.: 832,303

[22] Filed: Feb. 7, 1992

[30] Foreign Application Priority Data

Feb. 8, 1991 [JP] Japan .................................. 3-060894

[51] Int. Cl.$^5$ ...................... C08G 77/20; C08G 77/26; C08F 2/50
[52] U.S. Cl. ........................................ 522/33; 522/42; 522/44; 522/48; 522/74; 522/80; 522/99; 522/172; 522/173; 528/32; 528/38
[58] Field of Search ...................... 522/99, 172, 33, 42, 522/44, 48, 74, 80, 173; 528/28, 32, 38

[56] References Cited

U.S. PATENT DOCUMENTS

| | | | |
|---|---|---|---|
| Re. 33,737 | 11/1991 | Hida et al. | 522/99 |
| 4,201,808 | 5/1980 | Cully et al. | 522/172 |
| 4,678,688 | 7/1987 | Itoh et al. | 528/28 |
| 4,816,497 | 3/1989 | Lutz et al. | 522/42 |

FOREIGN PATENT DOCUMENTS 0349920  1/1990  European Pat. Off. .

OTHER PUBLICATIONS

Patent Abstracts of Japan, vol. 14, No. 215, (C-716) [4158], May 8, 1990, & JP-A-2-49082, Feb. 19, 1990, Kunio Ito, et al., "Agent for Forming Cured Coating Film".

*Primary Examiner*—Susan Berman
*Attorney, Agent, or Firm*—Oblon, Spivak, McClelland, Maier & Neustadt

[57] ABSTRACT

The present film-former composition comprises (a) an organosilazane copolymer having a perfluoroalkyl group-containing structural unit and a methacryloyloxy group-containing structural unit, (b) a photosensitizer soluble in an organic solvent, and (c) an organic solvent. The composition is cured by irradiation with ultraviolet light for a short period of time to form a film excellent in water repellency, oil repellency, and hardness.

15 Claims, No Drawings

FILM-FORMER COMPOSITION

BACKGROUND OF THE INVENTION

1. Field of the Invention

The present invention relates to a composition which will form a cured film by ultraviolet light.

2. Description of the Prior Art

Release agent compositions containing as a major component an organosilazane polymer (Japanese Preexamination Patent Publication (kokai) Nos. 60-145815 (1985) and 60-221470 (1985)) are known to form a water repellent cured film.

However, to cure satisfactorily the above release agent composition, generally requires a long time. Further, since the thus obtained cured film is soft, the durability against abrasion is low. Moreover, when said cured film is used for a long period of time, the water repellency of the cured film lowers finally and the oil repellency of the cured film is low.

SUMMARY OF THE INVENTION

Therefore, an object of the present invention is to provide a composition which can be cured in a short time and is capable of forming a film good in water repellency, oil repellency, and hardness.

According to the present invention, there is provided a film-former composition, comprising (a) an organosilazane copolymer comprising at least one structural unit selected from the group [A] consisting of the units represented by the following general unit formula [I]:

$$[R^1(CH_2)_m]_a R^2_b Si(NR^3)_{(4-a-b)/2} \qquad [I]$$

wherein $R^1$ represent a perfluoroalkyl group, $R^2$ and $R^3$, which may be the same or different, each represent a hydrogen atom or a monovalent hydrocarbon group, a is an integer of 1 to 3, b is an integer of 0 to 2, with a + b being an integer of 1 to 3, and m is an integer of 2 to 5, the units represented by the following general unit formula [II]:

$$[R^1(CH_2)_m]_a R^2_b SiO_{(4-a-b)/2} \qquad [II]$$

wherein $R^1$, $R^2$, a, b, and m have the same meanings as defined above, and the units represented by the following unit formula [III]:

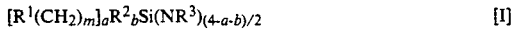 [III]

wherein $R^1$, $R^2$, $R^3$, and m have the same meanings as defined above, c is an integer of 0 or 1, d, e, and f each are an integer of 1 or 2, with c+d+e+f being 4, and at least one structural unit selected from the group [B] consisting of the units represented by the following general unit formula [IV]:

$$[R^4(CH_2)_n]_g R^2_h Si(NR^3)_{(4-g-h)/2} \qquad [IV]$$

wherein $R^4$ represents an unsaturated fatty ester, $R^2$ and $R^3$ have the same meanings as defined above, g is an integer of 1 to 3, h is an integer of 0 to 2, with g + h being an integer of 1 to 3, and n is an integer of 2 to 5, the units represented by the following general unit formula [V]:

$$[R^4(CH_2)_n]_g R^2_h SiO_{(4-g-h)/2} \qquad [V]$$

wherein $R^2$, $R^4$, g, h, and n nave the same meanings as defined above, and the units represented by the following general unit formula [VI]:

 [VI]

wherein $R^2$, $R^3$, $R^4$ and n have the same meanings as defined above, i is an integer of 0 or 1, and j, k, and l each are an integer of 1 or 2, with i+j+k+l being 4, provided that the structural unit selected from the group [A] and the structural unit selected from the group [B] are contained in such amounts that the molar content ratio of the perfluoroalkyl group ($R^1$) to the total of the hydrogen atom or monovalent hydrocarbon group ($R^2$) and the unsaturated fatty ester group ($R^4$) satisfies $R^1/(R^2+R^4)$ = from 99/1 to 50/50, (b) a photosensitizer soluble in an organic solvent, and (c) an organic solvent.

DETAILED DESCRIPTION OF THE INVENTION

(a) Organosilazane copolymers

In the present composition, the organosilazane copolymer (a) has as essential structural units at least on structural unit selected from the above group [A] and at least one structural unit selected from the above group [B].

In the general unit formulas [I] to [III] representing structural units in the group [A], $R^1$ represents a perfluoroalkyl group, preferably a perfluoroalkyl having 4 to 20 carbon atoms such as $—C_4H_9$, $—C_6F_{13}$, $—C_8F_{17}$, $—C_{10}F_{21}$, $—C_{12}F_{25}$, and $—C_{14}F_{29}$, and most preferably $—C_8F_{17}$.

$R^2$ and $R^3$, which may be the same or different, each represent a hydrogen atom or a monovalent hydrocarbon group. The monovalent hydrocarbon group preferably has 1 to 8 carbon atoms and preferred examples thereof include an alkyl group such as a methyl group, an ethyl group, and a propyl group, an alkenyl group such as a vinyl group and an allyl group, an aryl group such as a phenyl group and a tolyl group, and a cycloalkyl group such as a cyclohexyl group. In the present invention, in particular $R^2$ preferably represents a methyl group and $R^3$ preferably represents a hydrogen atom.

a is an integer of 1 to 3 and b is an integer of 0 to 2, with a +b being an integer of 1 to 3.

c is an integer of 0 or 1 and d, e, and f each are an integer of 1 or 2, with c+d+e+f being 4.

m is an integer of 2 to 5, preferably 2.

Specific examples of the structural units belonging to the above group [A] are shown below, but the present invention is not restricted to them.

$C_8F_{17}CH_2CH_2Si(NH)_{3/2}$, 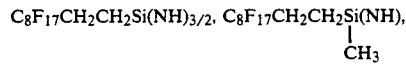

$C_4F_9CH_2CH_2Si(NH)_{3/2}$, 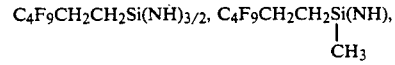

$C_{10}F_{21}CH_2CH_2Si(NH)_{3/2}$, $C_8F_{17}CH_2CH_2SiO$, 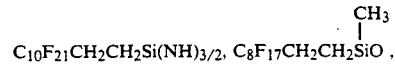

-continued

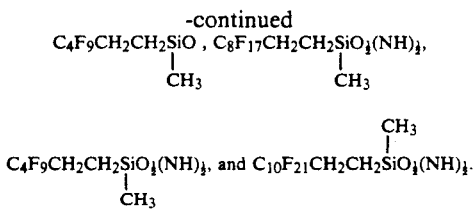

In the general unit formulas [IV] to [VI] representing structural units of the group (B), $R^4$ represents an unsaturated fatty ester group such as an acryloyloxy group and a methacryloyloxy group, with preference given to a methacryloyloxy group.

g is an integer of 1 to 3 and h is an integer of 0 to 2, with g+h being an integer of 1 to 3.

i is an integer of 0 or 1 and j, k, and l each are an integer of 1 or 2, with i+j+k+l being 4.

n is an integer of 2 to 5, preferably 3.

Specific examples of the structural units belonging to the group [B] are shown below, but the present invention is not restricted to them.

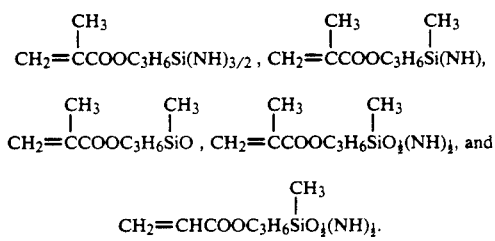

The organosilazane copolymer (a) used in the present invention is required to contain a structural unit belonging to the group [A] and a structural unit belonging to the group [B] in such amounts that the molar content ratio of the group ($R^1$) to the total of the group ($R^2$) and the group ($R^4$) satisfies $R^1/(R^2+R+R^4)$=from 99/1 to 50/50, preferably from 90/10 to 60/40. If this requirement is not satisfied, the water repellency of the film obtained from the filmformer composition is unsatisfactory.

This organosilazane copolymer may contain other structural unit in addition to the structural unit of the group [A] and the structural unit of the group [B]. Such a structural unit includes, for example, a unit represented by the following general unit formula [VII]:

$$R^2_pSi(NR^3)_{(4-p)/2} \quad [VII]$$

wherein $R^2$ and $R^3$ have the same meanings as defined above and p is an integer of 1 to 3, a unit represented by the following general unit formula [VIII]:

$$[R^1(CH_2)_m]_q[R^4(CH_2)_n]_rR^2_sSiO_{(4-q-r-s)/2} \quad [VIII]$$

wherein $R^1$, $R^2$, $R^4$, m and n have the same meanings as defined above, q and r each are an integer of 0 to 2, and s is an integer of 1 to 3, with q+r+s being an integer of 1 to 3, and a unit represented by the following general unit formula [IX]:

$$[R^1(CH_2)_m]_t[R^4(CH_2)_n]_uR^2_vSiO_{w/2}(NR^3)_{x/2} \quad [IX]$$

wherein $R^1$, $R^2$, $R^3$, $R^4$, m, and n have the same meanings as defined above, t and u each are an integer of 0 or 1, and v, w, and x each are an integer of 1 or 2, with t+u+v+w+x being 4.

By using an organosilazane copolymer into which such structural units in addition to the structural units of the groups [A] and [B] are introduced, the water repellency, the oil repellency, and the hardness of the film obtained from the film-former composition can be improved. In this case, it is required that the above-mentioned requirement regarding the contents of the groups $R^1$, $R^2$, and $R^4$ is satisfied.

Specific examples of the structural unit represented by the above general unit formula [VII] include $CH_3Si(NH)_{3/2}$, $(CH_3)_2Si(NH)_2$, and $(CH_3)_3SI(NH)_{\frac{1}{2}}$, specific examples of the structural unit represented by the above general unit formula [VIII] include

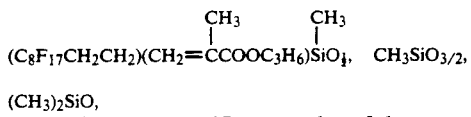

and $(CH_3)_3SiO_{\frac{1}{2}}$, and specific examples of the structural unit represented by the above general unit formula [IX] include

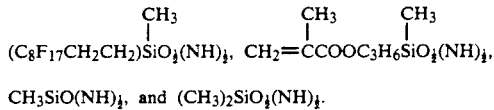

Preferable examples of the organosilazane copolymer (a) used in the present invention include

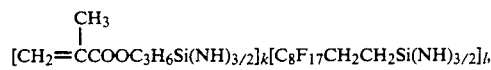

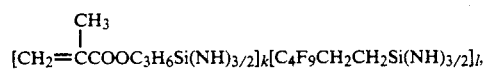

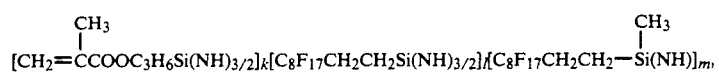

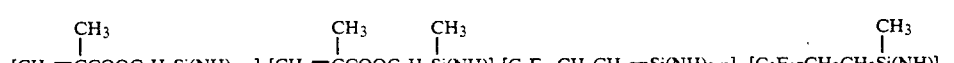

-continued $$[CH_2=\overset{CH_3}{\underset{|}{C}}COOC_3H_6Si(NH)_{3/2}]_k[CH_2=\overset{CH_3}{\underset{|}{C}}COOC_3H_6Si(NH)]_l[C_4F_9CH_2CH_2-\overset{CH_3}{\underset{|}{Si}}(NH)_{3/2}]_m[C_4F_9CH_2CH_2Si(NH)]_n,$$

$$[CH_2=\overset{CH_3}{\underset{|}{C}}COOC_3H_6Si(NH)_{3/2}]_k[CH_2=\overset{CH_3}{\underset{|}{C}}COOC_3H_6SiO]_l[(CH_3)_2Si-O_{\frac{1}{2}}(NH)_{\frac{1}{2}}]_m[C_8F_{17}CH_2CH_2Si(NH)_{3/2}]_n,$$

$$[CH_2=\overset{CH_3}{\underset{|}{C}}COOC_3H_6Si(NH)_{3/2}]_k[CH_2=\overset{CH_3}{\underset{|}{C}}COOC_3H_6SiO]_l[(CH_3)_2Si-O_{\frac{1}{2}}(NH)_{\frac{1}{2}}]_m[C_4F_9CH_2CH_2Si(NH)_{3/2}]_n,$$

$$[CH_2=\overset{CH_3}{\underset{|}{C}}COOC_3H_6Si(NH)_{3/2}]_k[C_8F_{17}CH_2CH_2Si(NH)_{3/2}]_l[C_8F_{17}CH_2CH_2\overset{CH_3}{\underset{|}{Si}}-O]_m[C_8F_{17}CH_2CH_2\overset{CH_3}{\underset{|}{Si}}O_{\frac{1}{2}}(NH)_{\frac{1}{2}}]_n,$$

$$[CH_2=\overset{CH_3}{\underset{|}{C}}COOC_3H_6Si(NH)_{3/2}]_k[C_4F_9CH_2CH_2Si(NH)_{3/2}]_l[C_4F_9CH_2CH_2\overset{CH_3}{\underset{|}{Si}}-O]_m[C_4F_9CH_2CH_2\overset{CH_3}{\underset{|}{Si}}O_{\frac{1}{2}}(NH)_{\frac{1}{2}}]_n,$$

$$[CH_2=\overset{CH_3}{\underset{|}{C}}COOC_3H_6SiO]_k[(CH_3)_2SiO_{\frac{1}{2}}(NH)_{\frac{1}{2}}]_l[C_8F_{17}CH_2CH_2\overset{CH_3}{\underset{|}{Si}}-(NH)_{3/2}]_m,$$

$$[CH_2=\overset{CH_3}{\underset{|}{C}}COOC_3H_6SiO]_k[(CH_3)_2SiO_{\frac{1}{2}}(NH)_{\frac{1}{2}}]_l[C_4F_9CH_2CH_2\overset{CH_3}{\underset{|}{Si}}-(NH)_{3/2}]_m,$$

$$[CH_2=CHCOOC_3H_6Si(NH)_{3/2}]_k[C_8F_{17}CH_2CH_2Si(NH)_{3/2}]_l,$$

$$[CH_2=CHCOOC_3H_6Si(NH)_{3/2}]_k[C_4F_9CH_2CH_2Si(NH)_{3/2}]_l,$$

and $$CH_2=CHCOOC_3H_6Si(NH)_{3/2}]_k[C_{10}F_{21}CH_2CH_2Si(NH)_{3/2}]_l.$$

The organosilazane copolymer described above can be synthesized in a manner known per se (see U.S. Pat. No. 2,564,674 and Japanese Pre-examination Patent Publication (kokai) Nos. 60-141758 (1985), 60-145815 (1985), and 60-221470 (1985)). That is, generally, the organosilazane can be synthesized by reacting a mixture composed of an organohalosilane having the corresponding structural units and an organohalosiloxane having the corresponding structural units with ammonia or a primary amine in an organic solvent.

For instance, as a raw material compound used for introducing structural units of the group [A], an organohalosilane represented by the following general formula [X]:

$$[R^1(CH_2)_m]_aR^2_bSiX_{4-a-b} \qquad [X]$$

wherein X represents a halogen atom and $R^1$, $R^2$, m, a and b have the same meanings as defined above, and an organohalosiloxane represented by the following general composition formula [XI]:

$$[R^1(CH_2)_m]_AR^2_BX_CSiO_{(4-A-B-C)/2} \qquad [XI]$$

wherein $R^1$, $R^2$, X, and m have the same meanings as defined above, A is such that $0.001<A<2.5$, B is such that $0\leq B<2.5$, and C is such that $0.001<C<2$ can be used.

As a raw material compound used for introducing structural units of the group [B], for example, an organohalosilane represented by the following general formula [XII]:

$$[R^4(CH_2)_m]_gR^2_hSiX_{4-g-h} \qquad [XII]$$

wherein $R^2$, $R^4$, n, g, h, and X have the same meanings as defined above and an organohalosiloxane represented by the following general composition formula [XIII]:

$$[R^4(CH_2)_m]_DR^2_EX_RSiX_{(4-D-E-F)/2} \qquad [XIII]$$

wherein $R^2$, $R^4$, n, and X have the same meanings as defined above, D is such that $0.001<D<2.5$, E is such that $0<E<2.5$, and F is such that $0.001<F<2$ can be used.

As a raw material compound for introducing structural units of the general unit formula [VII] that are structural units which do not fall in the groups [A] and [B], an organohalosilane represented by the following general formula [XIV]:

$$R^2_pSiX_{4-p} \qquad [XIV]$$

wherein $R^2$, X, and p have the same meanings as defined above such as $CH_3SiCl_3$, $(CH_3)_2SiCl_2$, $(C_6H_5)SiCl_3$, $(C_6H_5)_2SiCl_2$, and $(CH_3)(C_6H_5)SiCl_2$ can be used. Further, as a raw material compound for introducing structural units of the general unit formulas [VIII] and [IX], an organohalosiloxane represented by the following general composition formula [XV]:

$$[R^1(CH_2)_m]_G[R^4(CH_2)_n]_HR^2_IX_JSiO_{(4-G-H-I-J)/2} \qquad [XV]$$

wherein $R^1$, $R^2$, $R^4$, m, n, and X have the same meanings as defined above, G is such that $0\leq G<2.5$, H is such that $0\leq H<2.5$, I is such that $0<I<2.5$, and J is such that $0<J<2$ can be used. Examples of this organohalosiloxane include those represented by the following formulas:

$$Cl\!-\!\!\left[\begin{array}{c}CH_3\\|\\SiO\\|\\CH_3\end{array}\right]_m\!\!\!\begin{array}{c}CH_3\\|\\SiCl,\\|\\CH_3\end{array}$$

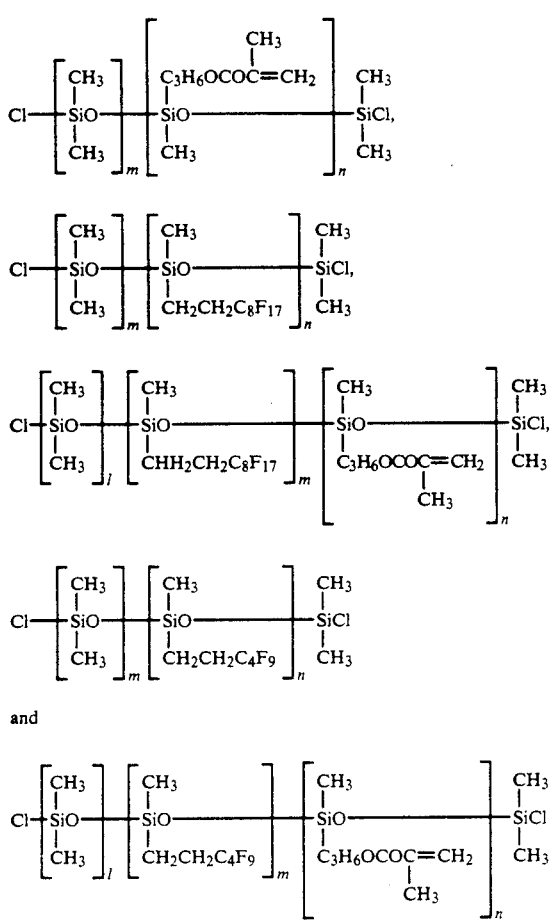

wherein in the formulas l, m, and n each are a positive integer.

(b) Photosensitizers

The photosensitizer (b) is required to be soluble in organic solvent. Among such photosensitizers, carbonyl compounds are preferable. Such carbonyl compounds include, for example, benzophenone, 2-hydroxy-2-methyl-phenylpropan-1-one, 1-(4-isopropylphenyl)-2-hydroxy-2-methylpropan-1-one, 1-(4-dodecylphenyl)-2--hydroxyl-2-methylpropan-1-one, 1-[4-(2-hydroxyethoxy) phenyl]-2-hydroxy-2-methylpropan 1-one, acetophenone, anthraquinone, methylanthraquinone, 1,2-naphthoquinone, and 1,4-naphthoquinone. Particularly, 2-hydroxy-2-methyl-2-phenylpropan-1-one is preferable.

The amount of the component (b) is preferably 1 to 50 parts by weight, more preferably 5 to 30 parts by weight, per 100 parts by weight of the component (a). If the amount of the component (b) is too small, the film-former composition will not be cured satisfactorily. On the other hand, if the amount is too large, the water repellency of the cured film becomes unsatisfactory.

(c) Organic solvents

The organic solvent (c) is preferably an organic solvent excellent in solvency for the above components (a) and (b). Such an organic solvent includes a fluorinated hydrocarbon, specifically, for example, trichlorofluoroethane, tetrachlorodifluoroethane, dichloromonofluoroethane, dichlorotrifluoroethane, bromochlorotrifluoroethane, and methaxylene hexafluoride. To these fluorinated hydrocarbons, if necessary, for example, a chlorinated hydrocarbon such as dichloroethane, trichloroethane, and methylene chloride, an aromatic hydrocarbon such as benzene, toluene, and xylene, an ether such as diethyl ether, dipropyl ether, and dibutyl ether, and a saturated hydrocarbon such as n-pentane, n-hexane, n-heptane, cyclohexane, and petroleum ether may be added.

The amount of the above organic solvent is preferably such that the concentration of the component (a) in the composition is brought to 0.1 to 30 wt. %, more preferably 1 to 5 wt. %. If the amount of the organic solvent is too small, the water repellency of the cured film will become unsatisfactory. On the other hand, if the amount is too large, the time required for vaporizing the organic solvent becomes longer and therefore the curing requires a longer period.

The curing method

The present composition can be cured with light. As light to be used, ultraviolet light is preferable and where the curing is effected by using ultraviolet light, the curing conditions may be such that the amount of light is 50 to 300 W/cm and the curing time is generally in the order of 0.1 sec to 5 min.

Uses

The cured film obtained from the present film-former composition is good in water repellency. Therefore, the present film-former composition can be used, for example, as a water repellency agent for windowpanes, for example, of automobiles, ships, and railway vehicles.

EXAMPLES

Example 1

3.0 g ($1.1 \times 10^{-2}$ mol) of a methacryloyloxy group-containing trichlorosilane having the following formula:

and 57.0 g ($9.8 \times 10^{-2}$ mol) of a fluorine containing trichlorosilane having the following formula:

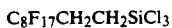

were dissolved in 200 ml of trichlorofluoroethane. The obtained solution was cooled to 5° C. and then ammonia gas was blown for 2 hours into the solution while keeping the the solution temperature at 20° C. or below. Thereafter, the solution was heated under reflux for 30 min to eliminate the excess ammonia dissolved in the solution. Then, the solution was cooled again to 5° C. and ammonium chloride that was a by-product was filtered off from the solution, thereby obtaining a colorless transparent solution containing an organosilazane copolymer.

Then, this solution was diluted with trichlorotrifluoroethane to obtain a 1 wt. % solution of the organosilazane copolymer. As a photosensitizer 2-hydroxy-2-methyl-1-phenylpropan-1-one in an amount of 20 parts by weight was added to the diluted solution containing 100 parts by weight of the organosilazane copolymer, thereby obtaining the intended film-former composition. In this case, the molar ratio of the $-C_8C_{17}$ group/the methacryloyloxy group corresponding to the above-mentioned $R^1/(R^2+R^4)$ was 9.8/1.1, approximately 90/10.

Further, the obtained film-former composition was coated on a glass substrate so that the thickness of the coating might be 0.5 μm and then was irradiated with ultraviolet light in an amount of light of 160 W/cm for 2 min to form a cured film, a test specimen composed of the glass substrate and the cured film formed thereon was thereby obtained.

Example 2

Example 1 was repeated, except that the amount of the methacryloyloxy group-containing trichlorosilane was 13.2 g ($5.1 \times 10^{-2}$ mol) and the amount of the fluorine-containing trichlorosilane was 46.8 g ($8.0 \times 10^{-2}$ mol), thereby obtaining a film-former composition. In this case, the molar ratio of the $-C_8C_{17}$ group/the methacryloyloxy group corresponding to the above-mentioned $R^1/(R^2+R^4)$ was 8.0/5.1, approximately 61/39.

From the obtained film-former composition, similarly to Example 1, a cured film-formed test specimen was obtained.

Comparative Example 1

Example 1 was repeated, except that in place of the 3.0 g of the methacryloyloxy group-containing trichlorosilane, 1.5 g ($1.2 \times 10^{-2}$ mol) of dichlorodimethylsilane was used and the amount of the fluorine-containing trichlorosilane was changed to 58.5 g ($10.1 \times 10^{-2}$ mol), thereby obtaining a colorless transparent solution containing an organosilazane copolymer.

This obtained solution was diluted with trichlorotrifluoroethane so that the content of the organosilazane copolymer of the solution may be brought to 1 wt. %. This diluted solution was coated on a glass substrate and was cured under conditions under which it was heated at 105° C. for 2 hours. Thereafter, the uncured portion of the composition on the cured product surface was removed with wiping paper thereby obtaining a film-formed test specimen.

Comparative Example 2

Example 1 was repeated, except that the amount of the methacryloyloxy group-containing trichlorosilane was changed to 60.0 g ($22.9 \times 10^{-2}$ mol), the fluorine-containing trichlorosilane was not used, and in place of the trichlorotrifluoroethane, toluene was used as a solvent, thereby obtaining a film-former composition.

Then, from the obtained film-former composition, a cured film-formed test specimen was obtained by irradiation with ultraviolet light for 2 min similarly to Example 1.

Comparative Example 3

Example 1 was repeated, except that the amount of the fluorine-containing trichlorosilane was changed to 60.0 g ($10.3 \times 10^{-2}$ mol) and the methacryloyloxy group-containing trichlorosilane was not used, thereby obtaining a colorless transparent solution containing an organosilazane copolymer.

This obtained solution was diluted with trichlorotrifluoroethane so that the concentration of the organosilazane copolymer of the solution might be brought to 1 wt. %. This diluted solution was coated on a glass substrate and was cured under conditions under which it was heated at 105° C. for 2 hours. Thereafter, the uncured portion of the composition on the cured product surface was removed with wiping paper thereby obtaining a film-formed test specimen.

In order to examine the water repellency and oil repellency of each of the cured films obtained above in Examples 1 and 2 and Comparative Examples 1 to 3, contact angles and the slip angles with respect to water and n-hexadecane were measured. The terminology "slip angle" herein means the minimum angle of an incline of a flat surface at which a liquid drop thereon starts to slip or slide down. The smaller the slip angle, the higher the repellency of the surface against the liquid. In the measurement of the contact angle, use was made of a contact angle meter (Trade name: CA-A, produced by Kyowa Kagaku K.K.), and a drop of water or n-hexadecane of about 6 μl was dropped on each test specimen under conditions having a temperature of 25° C. and the angle between the drop and the test specimen and not incorporating the drop was measured. In the measurement of the slip angle, use was made of a static friction coefficient measuring apparatus (manufactured by Shinto Kagaku K.K.), and one end of the test specimen disposed horizontally was raised such that it inclined at an angular velocity of 4 degrees/sec. under conditions of a temperature of 25° C. and the tilted angle of the test specimen was measured at which a water drop or an n-hexadecane drop started to slide down. It can be said that the greater the shown value of the contact angle is and the smaller the shown value of the slip angle is, the better the water repellency and the oil repellency of the film are.

Further, to examine the hardness of each of the obtained cured films, the pencil hardness of the cured film was measured. The pencil hardness was carried out by the hand scratching method shown in JIS K-5400 and the measured results were shown in terms of pencil scratch value. The results of the measurement are shown in Table 1.

TABLE 1

| | Water | | n-Hexadecane | | Pencil hardness |
| --- | --- | --- | --- | --- | --- |
| | Contact angle (°) | Slip angle (°) | Contact angle (°) | Slip angle (°) | (Pencil hardness scratch value) |
| Example 1 | 110 | 15 | 67 | 7 | 5H |
| Example 2 | 105 | 15 | 63 | 7 | 5H |
| Comparative Example 1 | 110 | 20 | 75 | 12 | 6B or below |
| Comparative Example 2 | 72 | 22 | 10 | 7 | — |
| Comparative Example 3 | 110 | 30 | 77 | 14 | 6B or below |

We claim:

1. A film-former composition, comprising:
   (a) an organosilazane copolymer comprising a structural unit of the formula [I]:

$$[R^1(CH_2)_m]_a R^2_b Si(NR^3)_{(4-a-b)/2} \quad [I]$$

and a structural unit of the formula [IV]:

$$[R^4(CH_2)_n]_g R^2_h Si(NR^3)_{(4-g-h)/2} \quad [IV]$$

wherein $R^1$ represents a perfluoroalkyl group, $R^2$ and $R^3$, which may be the same or different, each represent a hydrogen atom or a monovalent hydrocarbon group, $R^4$ represents an acryloyl or methacryloyl group, a and g are each an integer of 1 to 3, b and h are each an integer of 0 to 2, such that (a+b) and (g+h) are each an integer of 1 to 3, and m and n are each an integer of 2 to 5, provided that the structural unit of formula [I] and the structural unit of formula are contained in such amounts that the molar content ratio of the perfluoroalkyl group ($R^1$) to the total of the hydrogen atom or monovalent hydrocarbon group ($R^2$) and the acryloyl or methacryloyl group ($R^4$) satisfies the following equation:

$$R^1/(R^2+R^4) = \text{from } 99/1 \text{ to } 50/50,$$

(b) a photosensitizer soluble in an organic solvent, and
   (c) an organic solvent.

2. The composition of claim 1, wherein $R^1$ represents a perfluoroalkyl group having from 4 to 20 carbon atoms.

3. The composition of claim 2, wherein the structural unit of the formula [I] is at least one unit selected form the group consisting of $$C_8F_{17}CH_2CH_2Si(NH)_{3/2},$$

$$\underset{\underset{CH_3}{|}}{C_8F_{17}CH_2CH_2Si(NH),}$$

$$C_4F_9CH_2CH_2Si(NH)_{3/2}$$

$$\underset{\underset{CH_3}{|}}{C_4F_9CH_2CH_2Si(NH),}$$

and $$C_{10}F_{21}CH_2CH_2Si(NH)_{3/2}.$$

4. The composition of claim 1, wherein $R^4$ represents a methacryloyloxy group.

5. The composition of claim 4, wherein said structural unit of the formula [IV] is at least one unit selected from the group consisting of $$\underset{\underset{CH_2=CCOOC_3H_6Si(NH)_{3/2}}{}}{\overset{\overset{CH_3}{|}}{}}$$

and $$\underset{\underset{CH_2=CCOOC_3H_6Si(NH).}{}}{\overset{\overset{CH_3 \quad CH_3}{| \quad |}}{}}$$

6. The composition of claim 1, wherein said organosilazane copolymer (a) further contains at least one unit of the formula [VII]:

$$R^2_p Si(NR^3)_{(4-p)/2} \quad [VII]$$

wherein $R^2$ and $R^3$ have the same meanings as defined in claim 19 and p is an integer of 1 to 3.

7. A composition of claim 1, wherein said photosensitizer (b) is a carbonyl compound soluble in an organic solvent.

8. The composition of claim 7, wherein said photosensitizer is selected from the group consisting of benzophenone, 2-hydroxy-2-methyl-phenylpropan-1-one, 1-(4-isopropylphenyl)-2-hydroxy-2-methylpropan-1-one, 1-(4-dodecylphenyl)-2-hydroxyl-2-methylpropan-1-one, 1-[4-(2-hydroxyethoxy)phenyl]2-hydroxy-2-methylpropan-1-one, acetophenone, anthraquinone, methylanthraquinone, 1,2-naphthoquinone and 1,4-naphthoquinone.

9. A composition of claim 1, wherein said organic solvent (c) is a fluorinated hydrocarbon solvent.

10. A composition of claim 1, wherein said composition contains from 0.1 to 30 wt. % of said organosilazane copolymer (a) based on the weight of the composition, and 1 to 50 parts by weight of said photosensitizer based on 100 parts by weight of said organosilazane copolymer (a).

11. A composition of claim 10, wherein said composition consists essentially of from 0.1 to 30 wt. % of said organosilazane copolymer (a) based on the weight of the composition, 1 to 50 parts by weight of said photosensitizer based on 100 parts by weight of said organosilazane copolymer (a), and the balance of the composition consisting essentially of said organic solvent.

12. A composition of claim 11, wherein said composition contains from 1 to 5 wt. % of said organosilazane copolymer (a) based on the weight of the composition, and 1 to 50 parts by weight of said photosensitizer based on 100 parts by weight of said organosilazane copolymer (a).

13. A composition of claim 11, wherein a is 1, b is 0, g is 1 and h is 0.

14. A composition of claim 11, wherein said organic solvent is selected from the group consisting of trichlorofluoroethane, tetrachlorodifluoroethane, dichloromonofluoroethane, bromochlorotrifluoroethane and methaxylene hexafluoride, to which may be added a second solvent selected from the group consisting of dichloroethane, trichloroethane, methylene chloride, benzene, toluene, xylene, diethyl ether, dipropyl ether, dibutyl ether, n-pentane, n-hexane, n-heptane, cyclohexane and petroleum ether.

15. A composition of claim 11, wherein a is 1, b is 0, g is 1 and h is 0.

* * * * *